(12) United States Patent  
Kamperman et al.

(10) Patent No.: US 9,009,308 B2  
(45) Date of Patent: Apr. 14, 2015

(54) HYBRID DEVICE AND PERSON BASED AUTHORIZED DOMAIN ARCHITECTURE

(75) Inventors: Franciscus Lucas Antonius Johannes Kamperman, Eindhoven (NL); Robert Paul Koster, Eindhoven (NL); Geert Jan Schrijen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1024 days.

(21) Appl. No.: 10/565,663

(22) PCT Filed: Jul. 14, 2004

(86) PCT No.: PCT/IB2004/051226  
§ 371 (c)(1),  
(2), (4) Date: Jan. 23, 2006

(87) PCT Pub. No.: WO2005/010879  
PCT Pub. Date: Feb. 3, 2005

(65) Prior Publication Data  
US 2006/0190621 A1    Aug. 24, 2006

(30) Foreign Application Priority Data  
Jul. 24, 2003  (EP) .................................... 03102281

(51) Int. Cl.  
*G06F 15/173*  (2006.01)  
*G06F 15/16*  (2006.01)  
(Continued)

(52) U.S. Cl.  
CPC .............. *H04L 63/101* (2013.01); *G06F 21/10* (2013.01); *G06F 21/31* (2013.01);  
(Continued)

(58) Field of Classification Search  
USPC ........................................................ 709/245  
See application file for complete search history.

(56) References Cited

U.S. PATENT DOCUMENTS 6,223,291 B1 * 4/2001 Puhl et al. ...................... 726/28  
6,324,645 B1 * 11/2001 Andrews et al. ............... 713/157  
(Continued)

FOREIGN PATENT DOCUMENTS

JP          2003131751 A      5/2003  
JP          2003178163 A      6/2003  
(Continued)

OTHER PUBLICATIONS

Van Den Heuvel et al, "Secure Content Management in Authorised Domains", International Broadcasting Convention, XP002273504, Sep. 15, 2002, pp. 1-8.

*Primary Examiner* — Richard G Keehn

(57) ABSTRACT

This invention relates to a system and a method of generating an Authorized Domain (AD) by selecting a domain identifier, and binding at least one person (P1, P, PN1), at least one device (D1, D2, ..., DM), and at least one content item (C1, C2, ..., CNZ) to the Authorized Domain (AD) given by the domain identifier (Domain ID). Hereby, a number of verified devices (D1, D2, ..., DM) and a number of verified persons (P1, P2, ..., PN1) that is authorized to access a content item of the Authorized Domain (100) is obtained. In this way, access to a content item of an authorized domain by a person operating a device is obtained either by verifying that the content item and the person are linked to the same domain or by verifying that the device and the content item are linked to the same domain. Thereby, enhanced flexibility for one or more persons when accessing content in an authorized domain is obtained while security of the content is still maintaining. This is further done in a simple, secure and reliable way.

22 Claims, 3 Drawing Sheets

US 9,009,308 B2
Page 2

(51) Int. Cl.
  *H04L 29/06* (2006.01)
  *G06F 21/10* (2013.01)
  *G06F 21/31* (2013.01)
  *G11B 20/00* (2006.01)

(52) U.S. Cl.
  CPC ............... *G06F 2221/0706* (2013.01); *G06F 2221/2129* (2013.01); *G11B 20/00086* (2013.01); *G11B 20/00731* (2013.01); *G11B 20/00855* (2013.01); *H04L 63/0428* (2013.01); *H04L 63/0823* (2013.01); *H04L 2463/101* (2013.01)

(56) References Cited

U.S. PATENT DOCUMENTS

| | | | |
|---|---|---|---|
| 6,460,023 B1* | 10/2002 | Bean et al. | 705/54 |
| 6,463,534 B1* | 10/2002 | Geiger et al. | 713/168 |
| 6,880,007 B1* | 4/2005 | Gardos et al. | 709/225 |
| 7,047,560 B2 | 5/2006 | Fishman et al. | 726/6 |
| 7,194,543 B2* | 3/2007 | Robertson et al. | 709/226 |
| 2001/0039624 A1* | 11/2001 | Kellum | 713/201 |
| 2002/0031230 A1* | 3/2002 | Sweet et al. | 380/278 |
| 2002/0040439 A1* | 4/2002 | Kellum | 713/200 |
| 2002/0062451 A1* | 5/2002 | Scheidt et al. | 713/201 |
| 2002/0073308 A1* | 6/2002 | Benantar | 713/155 |
| 2002/0144108 A1* | 10/2002 | Benantar | 713/156 |
| 2002/0144119 A1* | 10/2002 | Benantar | 713/171 |
| 2002/0146237 A1 | 10/2002 | Safadi | |
| 2002/0157002 A1* | 10/2002 | Messerges et al. | 713/155 |
| 2003/0018491 A1* | 1/2003 | Nakahara et al. | 705/1 |
| 2003/0076955 A1* | 4/2003 | Alve et al. | 380/201 |
| 2003/0126431 A1* | 7/2003 | Beattie et al. | 713/156 |
| 2003/0144894 A1* | 7/2003 | Robertson et al. | 705/8 |
| 2003/0177376 A1* | 9/2003 | Arce Velleggia et al. | 713/189 |
| 2004/0025020 A1* | 2/2004 | Yoshimura et al. | 713/169 |
| 2004/0059941 A1* | 3/2004 | Hardman et al. | 713/201 |
| 2004/0078573 A1* | 4/2004 | Matsuyama | 713/175 |
| 2004/0083306 A1* | 4/2004 | Gloe | 709/245 |
| 2004/0088543 A1* | 5/2004 | Garg et al. | 713/157 |
| 2004/0098615 A1* | 5/2004 | Mowers et al. | 713/201 |
| 2005/0022227 A1 | 1/2005 | Shen et al. | |
| 2006/0106836 A1* | 5/2006 | Masugi et al. | 707/101 |
| 2008/0010365 A1* | 1/2008 | Schneider | 709/223 |

FOREIGN PATENT DOCUMENTS

| | | |
|---|---|---|
| JP | 2004062870 A | 2/2004 |
| JP | 2004139473 A | 5/2004 |
| JP | 2007531102 A | 11/2007 |
| WO | 02067449 A2 | 8/2002 |
| WO | 02067449 A3 | 8/2002 |
| WO | 03009112 A1 | 1/2003 |
| WO | 03034408 A2 | 4/2003 |
| WO | 03039155 A1 | 5/2003 |
| WO | 03039155 A2 | 5/2003 |
| WO | 03047204 A3 | 6/2003 |
| WO | 03098931 A1 | 11/2003 |
| WO | 2004038568 A2 | 5/2004 |
| WO | 2005093544 A1 | 10/2005 |

* cited by examiner

HYBRID DEVICE AND PERSON BASED AUTHORIZED DOMAIN ARCHITECTURE

The invention relates to a method of generating an Authorized Domain. The invention further relates to a system for generating an Authorized Domain. Further, the invention relates to a computer readable medium having stored thereon instructions for causing one or more processing units to execute the method according to the invention.

Recent developments in content distribution technologies (i.e. the Internet and removable media) make it much easier to exchange content than ever before. The rapid adoption by consumers shows that such technologies really address their needs. A side effect is that they also enable easy illegal copying and distribution of content. The content industry sees this latter development as a threat to their business. Therefore in recent years, the amount of content protection systems is growing in a rapid pace. Some of these systems only protect the content against illegal copying, while others are also prohibiting the user (person) to get access to the content. The first category is called Copy Protection (CP) systems. CP systems have traditionally been the main focus for consumer electronics (CE) devices, as this type of content protection is thought to be cheaply implemented and does not need bi-directional interaction with the content provider. Some examples are the Content Scrambling System (CSS), the protection system of DVD ROM discs and DTCP (a protection system for IEEE 1394 connections).

The second category is known under several names. In the broadcast world, systems of this category are generally known as conditional access (CA) systems, while in the Internet world they are generally known as Digital Rights Management (DRM) systems.

A home network can be defined as a set of devices that are interconnected using some kind of network technology (e.g., Ethernet, IEEE 1394, BlueTooth, 802.11b, 802.11g, etc.). Although network technology allows the different devices to communicate, this is not enough to allow devices to interoperate. To be able to do this, devices need to be able to discover and address the functions present in the other devices in the network. Such interoperability is provided by home networking middleware. Examples of home networking middleware are Jini, HAVi, UPnP, AVC.

The concept of Authorized Domains (ADs) tries to find a solution to both serve the interests of the content owners (that want protection of their copyrights) and the content consumers (that want unrestricted use of the content). The basic principle is to have a controlled network environment in which content can be used relatively freely as long as it does not cross the border of the authorized domain. Typically, authorized domains are centered around the home environment, also referred to as home networks. Of course, other scenarios are also possible. A user could for example take a portable device for audio and/or video with a limited amount of content with him on a trip, and use it in his hotel room to access or download additional content stored on his personal audio and/or video system at home. Even though the portable device is outside the home network, it is a part of the user's authorized domain. In this way, an Authorized Domain (AD) is a system that allows access to content by devices in the domain, but not by any others.

For a more extensive introduction to the use of an Authorized Domain, etc., see S. A. F. A. van den Heuvel, W. Jonker, F. L. A. J. Kamperman, P. J. Lenoir, Secure Content Management in Authorised Domains, Philips Research, The Netherlands, IBC 2002 conference publication, pages 467-474, held at 12-16 Sep. 2002.

Various proposals exist that implement the concept of authorized domains to some extent.

One type of previous solutions include device based Authorized Domains (ADs). Examples of such systems are SmartRight (Thomson Multimedia), xCP, and NetDRM (Matshushita). A further example of a device based AD given, for example, in European patent application serial number 02076998.0 (Ser. No. 10/514,901) by the same applicant.

In typical device based ADs, the domain is formed by a specific set of devices and content. Only the specific set of devices of the domain is allowed to access, use, etc. the content of that domain. There is not made any distinction of the various users of the specific set of devices.

A drawback of device based AD systems is that they typically do not provide the typical flexibility that a user wants or need, since users are restricted to a particular and limited set of devices. In this way, a user is not allowed to exercise the rights that the user has obtained anytime and anywhere he chooses. For example, if a user is visiting a friend's house he is not able to access his legally purchased content on the friend's devices as these devices would not typically be part of the particular and limited set of devices forming the domain comprising the user's content.

Another type of previous solutions are person based Authorized Domains, where the domain is based on persons instead of devices as was the case for device based ADs. An example of such a system is described, fpr example, in European patent application serial number 02079390.7 (Ser. No. 10/531,939) by the same applicant in which content is coupled to persons which then are grouped into a domain.

In a typical person based AD access to content bound to that AD is allowed by only a specific and limited set of users, but e.g. using any compliant device. Person based Authorized Domains typically offer easier domain management compared to device based ADs.

However, person based systems require person identification which is not always convenient or preferred by users. Further, a visitor to your home may want to access your content. As he does not have a person id device for that domain, it is not possible for him to access content. It would be preferred if devices in the home belonging to the domain could enable access of domain content by the visitor.

Therefore there is a need for a hybrid person and device based authorized domain having the individual advantages of each system.

It is an object of the invention to provide a method and corresponding system for providing an Authorized Domain structure based on both persons and devices. An additional object is to provide a method and system solving the above-mentioned shortcomings of prior art. A further object is to provide this in a simple, flexible, and efficient way.

These objects, among others, are achieved by a method (and corresponding system) generating an Authorized Domain (AD), the method comprising the steps of selecting a domain identifier uniquely identifying the Authorized Domain, binding at least one user to the domain identifier, and binding at least one device to the domain identifier, and thereby obtaining a number of devices and a number of persons that is authorized to access a content item of the Authorized Domain.

Hereby, a simple and efficient way of grouping devices and persons to an AD is obtained. Further, a hybrid device and person based Authorized Domain is provided. In this way, access is enabled to a content item of an authorized domain by a user operating a device either by verifying that the content item and the user is linked the same domain or by verifying that the device and the content item is linked to the same domain. Thereby, enhanced flexibility for one or more users when accessing content in an authorized domain is obtained while security of the content is still maintained. This is further done in a simple, secure, and reliable way.

In one embodiment, the method further comprises the step of binding at least one content item to the Authorized Domain given by the domain identifier.

In one embodiment, the step of binding at least one user to the domain identifier comprises: obtaining or generating a Domain Users List (DUC) comprising the domain identifier and a unique identifier for a user thereby defining that the user is bound to the Authorized Domain and/or the step of binding at least one device to the domain identifier comprises: obtaining or generating a Domain Devices List comprising the domain identifier and a unique identifier for a device thereby defining that the device is bound to the domain.

In one embodiment, the step of binding at least one content item to the Authorized Domain (AD) comprises:
  binding a content item to a User Right, where the User Right is bound to a user bound to the Authorized Domain, and/or
  binding a content item to a Device Right, where the Device Right is bound to a device bound to the Authorized Domain.

In one embodiment, the step of binding at least one content item to the Authorized Domain comprises:
  binding a content item to a Domain Right, where the Domain Right is bound to the Authorized Domain.

In one embodiment, the User Right or the Device Right or the Domain Rights comprises rights data representing which rights exists in relation to the at least one content item bound to the User Right or the Device Right or the Domain Rights.

In one embodiment, the method further comprises the step of controlling access to a given content item bound to the Authorized Domain by a given device being operated by a given user, the step comprising:
  checking if the given user is bound to the same Authorized Domain as the given content item, or
  checking if the given device is bound to the same Authorized Domain as the given content item,
  and allowing access for the given user via the given device and/or other devices to the content item if the given user is bound to the same Authorized Domain,
  or allowing access for the given user and/or other users via the given device to the content item if the given device is part of the same Authorized Domain.

In one embodiment, the method further comprises the step of controlling access to a given content item, being bound to the Authorized Domain and having a unique content identifier, by a given device being operated by a given user comprising:
  checking if the Domain Devices List of the Authorized Domain comprises an identifier of the given device, thereby checking if the given device is bound to the same Authorized Domain as the content item, and/or
  checking if the Domain User List of the Authorized Domain comprises an identifier of the given user thereby checking if the given user is bound to the same Authorized Domain as the content item,
  and allowing access to the given content item by the given device for any user if the given device is bound to the same Authorized Domain as the content item being accessed, and/or
  allowing access to the given content item by any device including the given device for the given user if the given user is bound to the same Authorized Domain as the content item being accessed.

In one embodiment, the step of controlling access of a given content item further comprises:
  checking that the User Right for the given content item specifies that the given user has the right to access the given content item and only allowing access to the given content item in the affirmative.

In one embodiment, every content item is encrypted and that a content right is bound to each content item and to a User Right or a Device Rights or a Domain Rights, and that the content right of a given content item comprises an decryption key for decrypting the given content item.

In one embodiment,
  the Domain Users List is implemented as or included in a Domain Users Certificate, and/or
  the Domain Devices List is implemented as or included in a Domain Devices Certificate, and/or
  the User Right is implemented as or included in a User Right Certificate, and/or
  the Device Right is implemented as or included in a Device Right Certificate, and/or
  the Domain Rights is implemented/included in a Domain Rights Certificate.

Advantageous embodiments of the system according to the present invention are defined in the sub-claims described in detail in the following. The embodiments of system correspond to the embodiments of the method and have the same advantages for the same reasons.

Further, the invention also relates to a computer readable medium having stored thereon instructions for causing one or more processing units to execute the method according to the present invention.

These and other aspects of the invention will be apparent from and elucidated with reference to the illustrative embodiments shown in the drawings, in which:

FIG. 1 schematically illustrates binding of persons, devices, user rights, and content in an authorized domain (AD) according to the present invention;

FIG. 2 schematically illustrates binding of persons, devices, user rights and content in an authorized domain (AD) according to an alternative embodiment of the present invention;

FIG. 3 schematically illustrate the elements of a Domain Devices Certificate (DDC) and of a Domain Users Certificate (DUC);

Figures 3, 5:
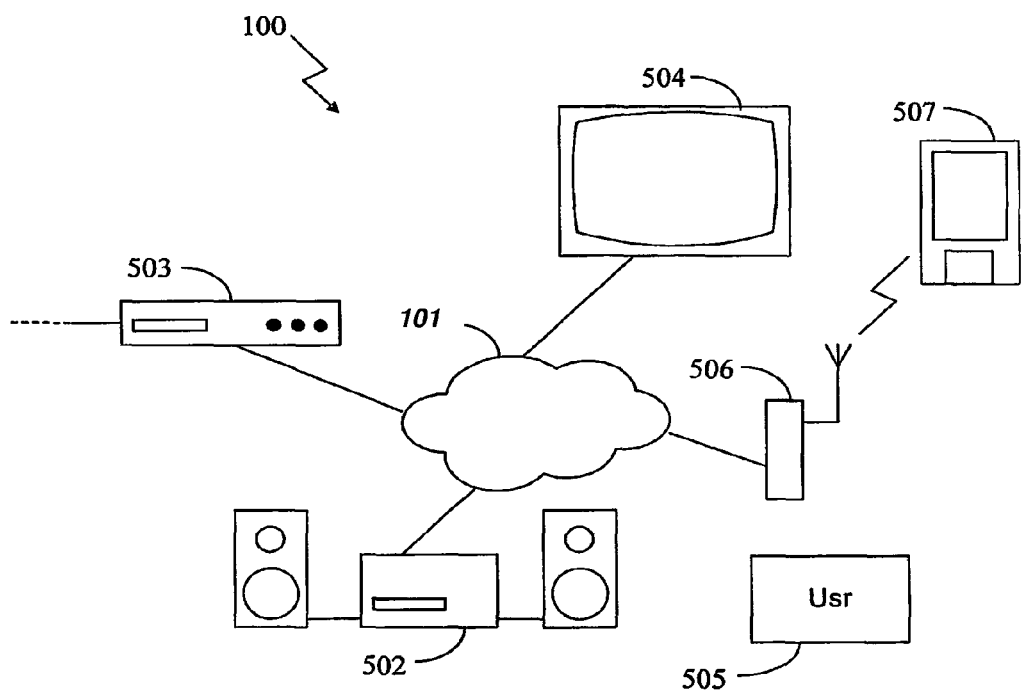

FIG. 5 schematically illustrate an exemplary system comprising devices and persons forming an authorized domain (AD).

Throughout the figures, same reference numerals indicate similar or corresponding features. Some of the features indicated in the drawings are typically implemented in software, and as such represent software entities, such as software modules or objects.

Figure 1:
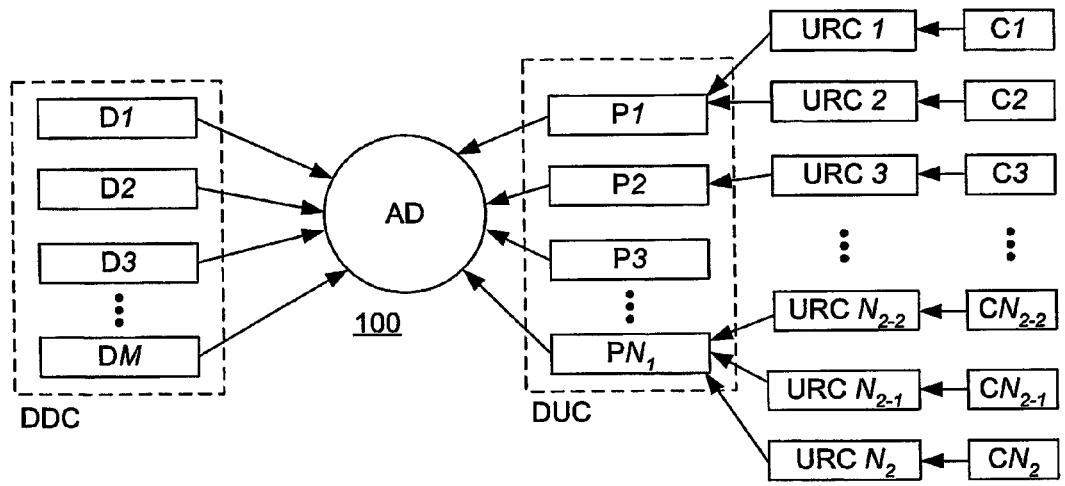

FIG. 1 schematically illustrates binding of persons, devices, user rights, and content in an authorized domain (AD) according to the present invention. Shown are an authorized domain (100) according to the present invention where a number of devices $D1, D2, D3, \ldots, DM$ (where M is equal to or larger than 1), a number of content items $C1, C2, C3, \ldots, CN_2$ (where $N_2$ is equal to or larger than 1) and a number of persons/users P1, P2, P3, ..., $PN_1$ (where $N_1$ is equal to or larger than 1) is bound to the AD according to an embodiment of the present invention. The devices, persons, and content items have been bound to the domain (100), as will be explained later. Also shown are one or more user rights (URC1, ... $URCN_2$), where preferably one content item is associated with one user right certificate specifying which rights a given person (or alternatively a given group of persons and/or all persons bound to the domain (100)) have in relation to the specific content item (or alternatively, several or all content items in the domain (100)).

For more information on an authorized domain architecture and implementation options, the reader is referred to European patent application serial number 01204668.6 by the same applicant or European patent application serial number 02076998.0 (Ser. No. 10/514,901) by the same applicant. European patent application serial number 02076998.0 (Ser. No. 10/514,901) more specifically describes an implementation in which content and devices are coupled to a domain. Additionally, European patent application serial number 02079390.7 (Ser. No. 10/531,939) by the same applicant describes an implementation in which content is coupled to persons which then are grouped into a domain.

Please note that in practice content can only be accessed/used by means of a user operating a device. In the following text we assume that devices used in the system are compliant and "public" devices. This means that a device will adhere to certain operation rules (e.g. will not illegally output content on an unprotected digital interface) and that ownership of a device is not important (public). Device compliancy management, i.e. compliant device identification, renew-ability of devices, and revocation of devices, will be assumed to be in place (using known techniques), and will not be considered further here.

The user right (URC1, ... $URCN_2$) is a single connection, binding, coupling etc. between one user and a content right (which is required to decrypt a piece of content). By introducing this user right we now have five main entities in our system that could work as follows:

content (C1, C2, C3, ..., $CN_2$): content items are preferably encrypted (there are many options, for example with a unique key per content title) and can be anywhere in the system; a content item is in this embodiment linked indirectly to a user right certificate via a content right, as also explained in connection with FIG. 4a.

content right (CR; not shown; see e.g. FIG. 4a): contains cryptographic key(s) or other suitable protection means to access a certain (encrypted/protected) content item. The system is flexible in the sense that content rights can be made unique per content title or even unique per specimen (copy) of content. Content rights should be only transferred to compliant devices. A more secure rule is to enforce that content rights may be only transferred to compliant devices that are operated by authorized users (i.e. users that are authorized to have access to the specific content right by means of their user rights). Content rights might also be stored together with the content on, for example, an optical disk. However, content rights must be stored securely since they contain the content decryption key.

user right certificate (URC1, ... $URCN_2$): a certificate or the like issued by the content provider that authorizes a person to use a certain content right (CR) (belonging to a certain piece of content). User rights can be in principle anywhere in the system. Preferably, the user right certificate also comprises rules (e.g. restricted to viewers 18 years or older, or European market only, etc.) of access to a certain content item.

device (D1, D2, D3, ..., DM): a device that is used to play, operate, record, present, display, modify, etc., a content item. Additionally, a (compliant) device can also preferably identify a user by means of a personalized identification device (e.g. such as a smart-card, a mobile phone, a biometric sensor, etc.) and collect certificates (e.g. from the smartcard, or from other devices) that prove that the user is allowed to use a certain content right. This content right could be obtained from the smart-card where it was stored (if it was stored there), or be obtained (securely transferred) from another compliant device on a network.

user/person (P1, P2, P3, ..., $PN_1$): A user is identified by some biometric or preferably by a personalized identification device (e.g. a smartcard, mobile phone, a mobile phone containing a smartcard or other types of devices that uniquely identifies a user) that he/she is wearing, carrying or has access to. A mobile phone comprising a smart card or another device having storage means is preferred since it allows users to carry rights with them (for accessing content on off-line devices). The identification device may itself be protected by a biometric authentication mechanism, so that anyone other than the legitimate owner cannot use the identification device. A user may also be identified using public key technology or zero-knowledge protocols or a combination thereof.

Preferably, authorized devices are bound to the AD (100) by a certificate. Likewise authorized persons/users are preferably also bound to the AD (100) via certificates. Content items are, in this particular embodiment, bound to a person by means of a user right certificate (URC). This user right certificate enables the use of a corresponding content right (CR) that preferably contains a cryptographic key for accessing the content, as will be explained in greater detail in connection with FIG. 4a. A user right certificate (URC) is typically linked with one content item, but could also be linked with multiple content items. An exemplary partial data structure of a content container (contains a content item), a URC and a CR are shown and explained in greater detail in connection with FIG. 4a.

Domain certificates are preferably issued by a domain authority. Alternatively, compliant devices with domain management capabilities can manage these certificates.

In the example shown in FIG. 1, each content item C1, C2, ..., CN2 is coupled to a user right certificate URC1, URC2, ..., URC $N_2$. URC1 and URC2 are coupled to person P1, URC3 coupled to person P2, $URC_{2-2}$, $URC_{2-1}$ and $URC_2$ are coupled to person $PN_1$, and URC4-$URC_{2-3}$ are distributed among person(s) P3-$PN_{1-1}$.

In this way, specific content C1 and C2 are coupled to a specific person P1, specific content C3 coupled to a specific person P2, specific content $CN_{2-2}$, $CN_{2-1}$ and $CN_2$ are coupled to a specific person $PN_1$, and specific content C4-$CN_{2-3}$ are distributed among specific person(s) P3-$PN_{1-1}$ via their respective URC.

In this shown embodiment, a single content item is only allowed to be coupled to a single URC (indirectly via a content right) and thereby a single person. If several users needs a copy of the same content item it would in this embodiment be present once for each user and treated as different content items, which make rights management simpler. Alternatively and just as applicable, a single content item could be coupled to more than one person, as a CR can be linked to multiple URCs.

Persons P1, P2, ..., $PN_1$ and Domain devices D1, D2, ..., DM are then grouped into forming the authorized domain (100).

Preferably, the binding, i.e. grouping and coupling, of devices, persons and content is according to the present invention done by the use of certificates. Preferably a Domain Devices Certificate or Domain Devices List (DDC), a Domain Users Certificate or Domain Users List (DUC), and a User Right Certificate or User Right List (URC) are used. In the following, reference is only made to certificates, although it is to be understood that such structures may, for example, be implemented as lists or the like instead.

The DDC lists the device(s), which are part of the domain (100), e.g. by comprising for each device a unique identifier. The DUC lists the user(s), which are part of the domain, e.g. by comprising a unique identifier or a (e.g. public) cryptographic key or a hash thereof for each user. DUC and DDC are shown an explained in greater detail in connection with FIG. 3. The URC preferably exist for each content item (so in the exemplary embodiment of FIG. 1 there are $N_2$ URCs) and indicates which rights the user (that the URC is linked to) has (and/or does not have) within the domain (100), and optionally a cross domain (X-AD rights), for the given content item linked to the URC. Alternatively, an URC coupled to a given user, for example, lists each content item that is coupled to the given user and what rights the given user has in relation to each coupled content item. Alternatively, only a single URC is used specifying the rights for every user, i.e. which content item(s) each user has coupled to him/her and what rights the user has (and/or does not have).

In a preferred embodiment, the DDC and DUC are associated with each other by means of a Domain Identifier (Domain_ID) contained in both certificates. In this way, a very simple way of linking the user(s) (and thereby the content item(s)) and the device(s) of a given domain together (and thereby forming the domain) is obtained.

If a specific device (e.g. device D3) wants to access a certain piece of content (e.g. content C1) it has to be proved or checked, etc. (using the certificates) that the certain piece of content is coupled to a specific person (e.g. person P1) that is a member of the same domain (100) as the specific device. This may, for example, be done by checking that an (unique) identifier of the specific device (e.g. device D3) is part of the DDC, that an (unique) identifier of the specific person (e.g. person P1) is part of the DUC, that both the DDC and DUC comprises the same Domain Identifier (e.g. Domain_ID=4 or Domain_ID=8 byte value (e.g. generated randomly); not shown), and that the URC for the specific person (e.g. URC1) specifies that the specific person has the right to access the certain piece of content (e.g. if it is within the validity period of his license or has not been used more than three times, etc.). This will be illustrated in greater detail in connection with FIG. 4a. Alternatively, the Domain ID may, instead of being a random number, be a reference to a data object e.g. a domain certificate.

By having the content items coupled to persons (via URCs) the ownership of content is easily reflected. Additionally, it is easier to administer a split of the AD, since by splitting the persons the appropriate content items is also split, since the content items are linked to persons.

Hereby, one or more devices, one or more persons, and at least one content item (via a person) are linked together in the domain preferably with the use of certificates or alternatively with the use of lists comprising the same described elements as for the certificates. It may be possible for the domain to comprise zero persons and/or zero devices and/or zero content items during some points. For example, when initially building the domain it may comprise zero content items or zero devices bound to the domain, etc.

In this way, a user that has been verified as belonging to the same domain as the content item being accessed may access the specific content using any device. Additionally, a user that is using a device that has been verified as belonging to the same domain as the content item being accessed may access the specific content using that specific device. Further all users may access the specific content item on that specific device.

This gives enhanced flexibility for one or more users when accessing content in an AD while security of the content is still maintaining.

In an alternative embodiment, the content may be bound to the devices of the domain instead of to the persons of the domain. Instead of a User Right Certificate a Device Right Certificate (DevRC) (not shown) is used. The Device Right Certificate (DevRC) would then have the same content as the URC with the exception of a Device ID instead of a Person ID. The rest is unchanged.

It is also to be understood that instead of having one list or certificate comprising users (i.e. the DUC) and one list or certificate comprising devices (i.e. DDC) above and in the following other arrangements may also be used. As an alternative, both devices and users could be comprised in a single list/certificate. Further, several lists/certificates comprising devices and/or several lists/certificates comprising users and/or combinations thereof may be used just as well.

Figure 2:
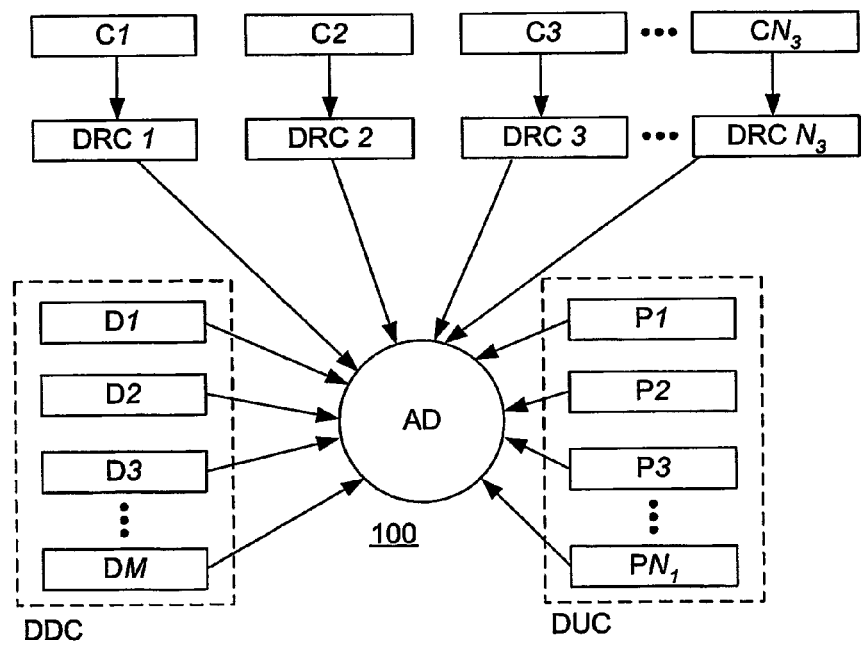

FIG. 2 schematically illustrates binding of persons, devices, user rights, and content in an authorized domain (AD) according to an alternative embodiment of the present invention. This shown embodiment corresponds to the one shown in FIG. 1 with the only exception that instead of coupling content items C1, C2, ..., $CN_2$ to persons P1, P2, ..., $PN_1$ via user right certificates URC1, URC2, ..., URC $N_2$, the content items are coupled to the domain (100) via one or more Domain Rights (DRC). Preferably, one content item is coupled to one DRC. In a preferred embodiment the DRC is implemented as a certificate.

If a specific device (e.g. device D3), in this embodiment, wants to access a certain piece of content (e.g. content C1) it has to be proved or checked, etc. (using the certificates) that the certain piece of content is coupled to the same domain (100) as the specific device or that a specific person (e.g. person P1) operating the device is a member of the domain. This may in this embodiment, for example, be done by checking that an (unique) identifier of the specific device is part of the DDC or that an (unique) identifier of the specific person is part of the DUC. Further it should be checked that the certain piece of content is coupled to a DRC that is part of the domain and that the DDC or the DUC comprises the same Domain Identifier, and that the DRC for the specific content specifies that a person of the domain has the right to access the certain piece of content (e.g. if it is within the validity period of a license or it has not been used more than three times). Hereby access to a content item is given either via a compliant device of the domain or via a valid person id. This will be illustrated in greater detail in connection with FIG. 4b.

FIG. 3 schematically illustrate the elements of a Domain Devices Certificate (DDC) and of a Domain Users Certificate (DUC). As shown, the Domain Devices Certificate (DDC) comprises a listing of unique identifiers (Dev.ID1, Dev.ID2, ...) for one or more devices belonging to a given domain, i.e. being authorized devices in the domain. In a preferred embodiment, the device identifier for a given device, e.g. Dev.ID1, is an (un-changeable at least by users)

serial or ID number, etc. The given domain is specified by the value of the Domain ID, which for example, may be an 8 byte random identifier.

Certificates according to the present invention (DDC, DUC, etc.) could, for example, be implemented by the well-known SPKI authorization certificate. Additionally, one useful option is to put a Domain_ID in a holder field of such a SPKI certificate implementing the DDC, the DUC and/or the DRC.

The Domain Users Certificate (DUC) comprises a listing of unique identifiers (Pers_ID1, Pers_ID2, . . . ) for one or more users/persons belonging to the given domain, i.e. being authorized users in the domain. The given domain that the listed users are authorized within is specified by the value of the Domain ID like described above for the Domain Devices Certificate (DDC). A Domain Users Certificate (DUC) and a Domain Devices Certificate (DDC) is linked by having the same value of the Domain ID and thereby defines the authorized domain (comprising both devices and users).

Figure 4A:
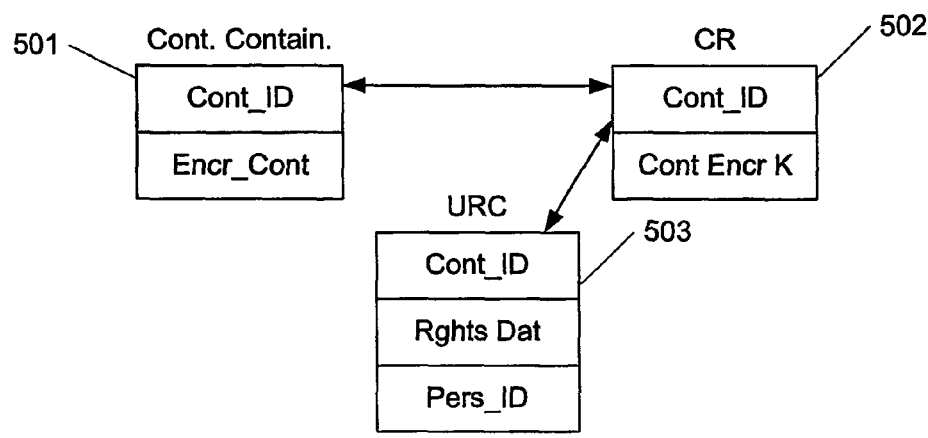
FIG. 4a illustrates an exemplary (partial) data structure of a content container, a content right (CR) and a user right certificate (URC) according to the embodiment of the present invention shown in FIG. 1.

FIG. 4a illustrates an exemplary (partial) data structure of a content container, a content right (CR) and a user right certificate (URC) according to the embodiment of the present invention shown in FIG. 1. Shown is a content container (501) which contains protected data/content, for example obtained from a Service Provider. The content container further comprises a content identifier (Cont_ID) unique for the particular content item embedded in the content container. In this way, the content identifier (Cont_ID) is used to locate a given content item of the domain, for example by searching every content container belonging to the specific domain for a matching Cont_ID.

Also shown is a content right (CR) (502) comprising a content identifier (Cont_ID) and a content encryption key (Cont Encr K). The content identifier is used to establish a link to the encrypted content item (in a content container) that the content encryption key is for, i.e. the content that the key is needed to de-crypt and thereby enable access to. In this particular embodiment, the encryption key is a symmetrical key, i.e. the same key is used to both encrypt and decrypt data. Alternatively, other secure schemes may be used.

Further shown is a user right (UR) or User Right Certificate (URC) (503). The URC comprises a content identifier (Cont_ID) used for linking a specific content item (and content right) with a specific URC. The URC also comprises a person/user identifier (Pers_ID) that indicates which person the specific content is bound to. The person/user identifier could for example, be an ID or serial number for a given person, a name, a hash value of a public key of the user or in general any unique identifier of a person.

Further, the URC comprises rights data (Rghts Dat) that define what the given user (as identified by the Pers_ID) is allowed to do in relation with the specific content item (contained in the content container comprising the same Cont_ID). These rights data may, for example, specify play rights (e.g. restricted to viewers 18 years or older, or European market only, etc.), one-generation copy rights, a validity period, not used more than three times etc. Further, the rights data (Rghts Dat) may also define what all users are allowed to do in relation with the specific content item (which may be the same or different than the rights of the person identified by Pers_ID).

As an example, the well-known SPKI authorization certificate could be used to implement such a URC.

In the embodiment, where content is linked via devices to the domain instead of via persons, no URC would be needed, but a Device Right Certificate, that would be the same as the URC except that it contains a Device ID instead of a Person ID.

To illustrate the use of a content container, a content right (CR) and a user right certificate (URC) according to this embodiment of the present invention consider the following simple example illustrating access to a content item by a user.

The content identifier (Cont_ID) for the given content item that the user wants to access and the person identifier (Pers_ID) of the user are obtained. The person identifier may, for example, be obtained on the basis of a personalized identification device (e.g. a smart card, mobile phone, a mobile phone containing a smartcard, a biometric sensor, etc. or in another way). The content identifier may, for example, be obtained on the basis of a file name, the selection of a file, from a header of the content container, etc.

It is checked if the content item and the user belong to the (same) Authorized Domain. Checking whether a user belongs to a domain is done by checking if the person identifier (Pers_ID) is comprised in a Domain Users Certificate (DUC) (shown in FIGS. 1, 2 and 3). If so, then it has been verified that the user is part of the domain and is allowed to access content also being a part of the same domain.

Then it is checked whether the given content item also belongs to the same domain, by checking if the content identifier of the content item is bound to a person bound to the same domain, i.e. by checking whether there exist a URC bound to the domain that comprises the same content identifier. If so, then the content item belongs to the same domain and the user (given that the user and/or the device that is used have been verified) therefore has the right to access it. Further, the rights data (Rghts Dat) of the URC may also specify a restricted access to the content item. The rights data may specify rules, rights, conditions for the person identified with Pers_ID and/or rules, rights, conditions in general. For example, it could specify that that every user in the domain has play rights while the user linked via Pers_ID in addition has exclusive first generation copy rights.

Usually, the user will obtain access to the content item using a specific device. If the user is not part of the domain or no valid user ID can be obtained (e.g. because it is a friend accessing the content), then it has to be checked whether the specific device that the user is using to access the content item is part of the same domain as the content item in order to allow the user to access the content item, since he is not (or it can not be established that he is) part of the same domain as the content item. This is done by obtaining the Domain_ID of the DUC that the content item (via a person) was bound to. This Domain_ID is used to determine a Domain Devices Certificate (DDC) (shown in FIGS. 1, 2 and 3) comprising the same Domain_ID and checking if the DDC comprises a Dev.ID for the specific device that the user is trying to use to access the content item. If the DDC comprises a Dev.ID for the specific device then the user (and all other users) may use the specific device to access the specific content (and all other content of that domain).

These three steps of validating access to the content item, the user and the device may alternatively be done in another order than the one described and e.g. also in parallel at least to a certain extent.

After it has been verified that the user or the device is part of the same domain as the content, then the obtained content identifier is used to locate the content right (CR) of the specific content item being accessed in order to obtain the cryptographic key that has to be used to decrypt the encrypted content item. Further, the content container comprising the encrypted content item is also located using the content identifier.

Finally, the key in the content right is used to decrypt the content item which is now accessible, e.g. for rendering, copying on an optical disk, editing, etc. Alternatively, the content item may also be decrypted using the content right before sending it to the device for access, whereby only the content item needs to be transmitted. However, this requires special measures in order to protect the content item during transfer so that it is not possible to 'leak' the unprotected content.

This process is illustrated in FIG. 4a by the arrows linking the Cont_ID of the various structures.

In this way, if a specific user that has been verified as belonging to the same domain as the content item being accessed then there is, as mentioned, no need for checking whether the device he is using also belongs to the same domain. Further, the validated user may access the specific content item using all devices. Likewise, if a specific device has been verified as belonging to the same domain, then all users may access the specific content item using that specific device and there is no need to verify the user.

Therefore, enhanced flexibility for one or more users when accessing content in an AD is obtained while security of the content is still maintaining.

Figure 4B:
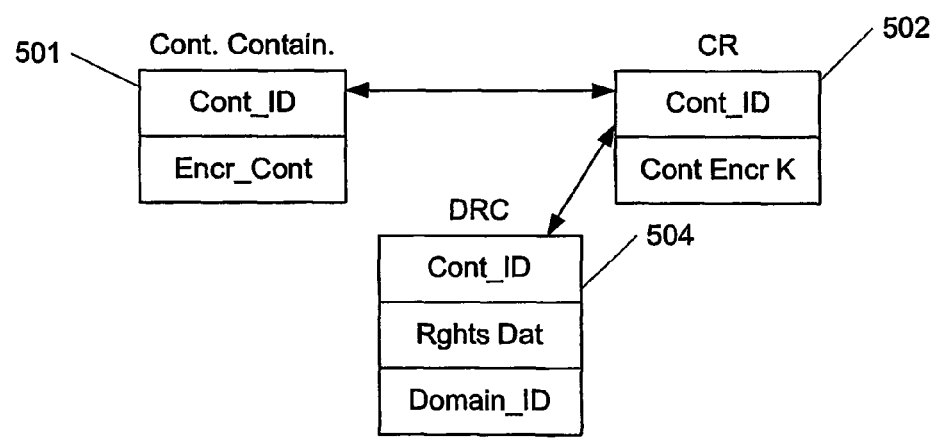
FIG. 4b illustrates an exemplary (partial) data structure of a content container, a content right (CR) and a Domain Rights Certificate (DRC) according to the embodiment of the present invention shown in FIG. 2.

FIG. 4b illustrates an exemplary (partial) data structure of a content container, a content right (CR) and a Domain Rights Certificate (DRC) according to the embodiment of the present invention shown in FIG. 2. In this embodiment, content items are bound to the domain via a DRC and not to users (via a URC) of the domain. Shown is a content container (501) and a content right (CR) (502) that corresponds to the one shown and explained, for example, in connection with FIG. 4a.

Further shown is a Domain Rights Certificate (504) that comprises a content identifier (Cont_D) used for linking a specific content item (and content right) with a specific DRC. The DRC also comprises a domain identifier (Domain_ID) that indicates which domain the specific content is bound to. The domain identifier corresponds to the one in the Domain Devices Certificate (DDC) and the Domain Users Certificate (DUC) explained in connection with FIGS. 1, 2 and 3.

Further, the DRC (504) comprises rights data (Rghts Dat) that define what one or more users are allowed to do in relation with the specific content item (contained in the content container comprising the same Cont_ID). These rights data correspond to the rights data of the URC explained in connection with FIG. 4a.

To illustrate the use of a content container, a content right and a domain rights certificate according to this embodiment of the present invention consider the following simple example illustrating access on a specific device to a content item by a user.

The content identifier (Cont_ID) for the given content item that the user wants to access, the person identifier (Pers_ID) of the user, and the domain identifier (Domain_ID) of the domain containing the content item are obtained. The content identifier and the person identifier may be obtained as described in connection with FIG. 4a. The domain identifier (Domain_ID) is obtained from the Domain_ID of the DRC that the content is bound to.

It is checked if the content item and the user belong to the (same) Authorized Domain. Checking whether a user belongs to a domain is done by checking if the person identifier (Pers_ID) is comprised in a Domain Users Certificate (DUC) (as shown in FIGS. 1, 2 and 3) having the specific domain identifier. If so, then it has been verified that the user is part of the domain and is allowed to access content also being a part of the same domain.

Then it is checked whether the given content item also belongs to the same domain, by checking if the content identifier of the content item is bound to the same domain, i.e. by checking whether there exist a DRC bound to the domain that comprises the same content identifier. If so, then the content item belongs to the same domain and the user (given that the user and/or the device that is used have been verified) therefore has the right to access it. Further, the rights data (Rghts Dat) of the DRC may also specify a restricted access to the content item, as described in connection with FIG. 4a.

Usually, the user will obtain access to the content item using a specific device. If the user is not part of the domain or no valid user ID can be obtained (e.g. because it is a friend accessing the content), then it has to be checked whether the specific device that the user is using to access the content item is part of the same domain as the content item in order to allow the user to access the content item, since he is not (or it can be established that he is) part of the same domain. This is done by obtaining the Domain_ID of the DRC that the content was bound to. This Domain_ID is used to determine a Domain Devices Certificate (DDC) (shown in FIGS. 1, 2 and 3) comprising the same Domain_ID and checking if the DDC comprises a Dev.ID for the specific device that the user is trying to use to access the content item. If the DDC comprises a Dev.ID for the specific device then the user (and all other users) may use the specific device to access the specific content (and all other content of that domain).

These three steps of validating access to the content item, the user and the device may alternatively be done in another order than the one described and e.g. also in parallel at least to a certain extent.

After it has been verified that the user, the content and the device is part of the same domain, then the content item is accessed as described in connection with FIG. 4a, i.e. obtaining the content right and decrypting the content, etc.

This process is illustrated in FIG. 4b by the arrows linking the Cont_ID of the various structures.

FIG. 5 schematically illustrate an exemplary system comprising devices and persons forming an authorized domain (AD). Shown is network (101) that enables communication between a number of devices e.g. in a household. Devices in the example is a television set (504), a digital video system (503), a music set (502) and a portable device (507) that is in wireless communication with the network (101) via a wireless access point (506). Further shown is a user/person (505).

In one exemplary scenario, an Authorized Domain (100) has the television set (504), the digital video (503), the music set (502) and the user (505) bound to it in addition to a number of content items (not shown) (bound according to FIG. 1 via persons/users or via devices or bound according to FIG. 1 via Domain Rights Certificate).

In this scenario, the user wants to access a given content item on the portable device (507). He may be located in the same place as the devices or at another place (e.g. in a hotel room). For a user to obtain access to the content item according to the invention, it has to be checked that the person (505) belongs to the domain (100) since the portable device (507) does not. This may be done by uniquely identifying the user e.g. using a smart card reader in the portable device (507), which then may transfer the User ID to the network (101). The content right and the content item is assumed to be on the portable device (507) (otherwise it may be transmitted there).

The user is then checked as described in connection with FIG. 4a or 4b. After validation of the user, then the content item may be accessed.

In another exemplary scenario, an Authorized Domain (100) has the television set (504), the digital video (503), the music set (502) and the portable device (507) bound to it in addition to a number of content items (not shown) (bound according to FIG. 1 via persons/users or via devices or bound according to FIG. 1 via Domain Rights Certificate). The user (505) is in this scenario not bound to the Authorized Domain (100) as he, for example may be a neighbor or friend visiting. In this scenario, the user also wants to access a given content item on the portable device (507).

For a user to obtain access to the content item according to the invention, it has to be checked that the portable device (507) belongs to the domain (100) since the person (505) does not.

This may be done by checking if the portable device (507) is bound to the same domain as the content item as described in connection with FIG. 4a or 4b. After validation of the device, then the content item may be accessed by the user on the portable device (507).

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of generating an Authorized Domain (AD) comprises:
    selecting a domain identifier (Domain_ID) uniquely identifying the Authorized Domain (AD),
    binding at least one person (P1, P2, ..., $PN_1$) to the domain identifier (Domain_ID) comprising obtaining or generating a domain users list (DUC) comprising the domain identifier and a unique identifier,
    binding at least one device (D1, D2, ..., DM) to the domain identifier (Domain_ID), and
    binding at least one content item (C1, C2, ..., $CN_2$) to the Authorized Domain (AD) given by the domain identifier (Domain_ID),
    thereby obtaining a number of devices (D1, D2, ..., DM) and a number of persons (P1, P2, ..., $PN_1$) that are authorized to access content items (C1, C2, ..., $CN_2$) of said Authorized Domain (AD),
    wherein access to the at least one content item (C1, C2, ..., $CN_2$) is obtained, via an authorization certificate, by verifying that the at least one content item (C1, C2, ..., $CN_2$) and the at least one person (P1, P2, ..., $PN_1$) are linked to the same domain identifier (Domain_ID) or by verifying that the at least one device (D1, D2, ..., DM) and the at least one content item (C1, C2, ..., $CN_2$) are linked to the same domain identifier (Domain_ID);
    wherein the authorization certificate includes the domain identifier (Domain_ID) in a holder field of the authorization certificate, and
    wherein the authorization certificate comprises rights data specifying rules, rights and conditions pertaining to access to certain content items for the at least one person in the domain or for every user in the domain and therefore creates or defines part of the domain.

2. A method according to claim 1, wherein the binding at least one person (P1, P2, ..., $PN_1$) to the domain identifier (Domain_ID) comprises:
    obtaining or generating a Domain Users List (DUC) comprising the domain identifier (Domain_ID) and a unique identifier (Pers_ID1, Pers_ID2, ..., $Pers\_IDN_1$) for a person (P1, P2, ..., $PN_1$) thereby defining that the person is bound to the Authorized Domain (AD),
and/or in that
    the binding at least one device (D1, D2, ..., DM) to the domain identifier (Domain_ID) comprises:
    obtaining or generating a Domain Devices List (DDC) comprising the domain identifier (Domain_ID) and a unique identifier (Dev.ID1, Dev.ID2, ..., Dev.IDM) for a device (D1, D2, ..., DM) thereby defining that the device is bound to the Authorized Domain (AD).

3. A method according to claim 2, the method further comprises controlling access to a given content item (C1, C2, ..., $CN_2$), being bound to the Authorized Domain (AD) and having a unique content identifier (Cont_ID), by a given device being operated by a given person comprising:
    checking if the Domain Devices List (DDC) of the Authorized Domain (AD) comprises an identifier (Dev.ID) of the given device, thereby checking if the given device is bound to the same Authorized Domain (AD) as the content item, and/or
    checking if the Domain User List (DUC) of the Authorized Domain (AD) comprises an identifier (Pers_ID) of the given person (P1, P2, ..., $PN_1$) thereby checking if the given person is bound to the same Authorized Domain (AD) as the content item,
    and allowing access to the given content item (C1, C2, ..., $CN_2$) by the given device (D1, D2, ..., DM) for any person if the given device is bound to the same Authorized Domain (AD) as the content item being accessed, and/or allowing access to the given content item (C1, C2, ..., $CN_2$) by any device including the given device for the given person if the given person is bound to the same Authorized Domain (AD) as the content item being accessed.

4. A method according to claim 2, wherein the binding at least one content item (C1, C2, ..., $CN_2$) to the Authorized Domain (AD) comprises:
    binding a content item (C1, C2, ..., $CN_2$) to a User Right (URC1, URC2, ... $URCN_2$), where said User Right (URC1, URC2, ... $URCN_2$) is bound to a person (P1, P2, ..., $PN_1$) which is bound to the Authorized Domain (AD), and/or
    binding a content item (C1, C2, ..., $CN_2$) to a Device Right (DevRC), where said Device Right (DevRC) is bound to a device (D1, D2, ..., DM) which is bound to the Authorized Domain (AD), and/or
    binding a content item (C1, C2, ..., $CN_2$) to a Domain Rights (DRC1, DRC2, ... $DRCN_2$), where said Domain Rights (DRC1, DRC2, ... $DRCN_2$) is bound to the Authorized Domain (AD).

5. A method according to claim 4, wherein the User Right (URC1, URC2, ... $URCN_2$) or the Device Right (DevRC) or the Domain Rights (DRC1, DRC2, ... $DRCN_2$) comprises rights data (Rghts Dat) representing which rights exists in relation to the at least one content item (C1, C2, ..., $CN_2$) bound to the User Right (URC1, URC2, ... $URCN_2$) or the Device Right (DevRC) or the Domain Rights (DRC1, DRC2, ... $DRCN_2$).

6. A method according to claim 4, wherein
the Domain Users List (DUC) is implemented as or included in a Domain Users Certificate, and/or
the Domain Devices List (DDC) is implemented as or included in a Domain Devices Certificate, and/or
the User Right (URC1, URC2, . . . , URCN$_2$) is implemented as or included in a User Right Certificate
the Device Right (DevRC) is implemented as or included in a Device Right Certificate, and/or
the Domain Rights (DRC1, DRC2, . . . , DRCN$_2$) is implemented as or included in a Domain Rights Certificate.

7. A method according to claim 1, the method further comprises controlling access to a given content item bound to the Authorized Domain (AD) by a given device being operated by a given person, comprising:
checking if the given person is bound to the same Authorized Domain (AD) as the given content item, or
checking if the given device is bound to the same Authorized Domain (AD) as the given content item,
and allowing access for the given person via the given device and/or other devices to the content item if the given person is bound to the same Authorized Domain (AD),
or allowing access for the given person and/or other persons via the given device to the content item if the given device is part of the same Authorized Domain (AD).

8. A method according to claim 7, wherein the binding at least one content item (C1, C2, . . . , CN$_2$) to the Authorized Domain (AD) comprises:
binding a content item (C1, C2, . . . , CN$_2$) to a User Right (URC1, URC2, . . . URCN$_2$), where said User Right (URC1, URC2, . . . URCN$_2$) is bound to a person (P1, P2, . . . , PN$_1$) which is bound to the Authorized Domain (AD), and
wherein the controlling access of a given content item further comprises:
checking that the User Right (URC1, URC2, . . . URCN$_2$) for the given content item specifies that the given person (P1, P2, . . . , PN$_1$) has a right to access the given content item (C1, C2, . . . , CN$_2$) and only allowing access to the given content item (C1, C2, . . . , CN$_2$) in the affirmative.

9. A method according to claim 1, wherein every content item is encrypted and that a content right (CR) is bound to each content item and to a User Right (URC) or a Device Right (DevRC) or a Domain Rights (DRC), and that the content right (CR) of a given content item comprises a decryption key for decrypting the given content item.

10. A non-transitory computer readable medium having stored thereon instructions for causing one or more processing units to execute the method according to claim 1.

11. A system for generating an Authorized Domain (AD), the system comprising:
at least one hardware processor; and
means for obtaining a domain identifier (Domain_ID) uniquely identifying the Authorized Domain (AD),
means for binding at least one person (P1, P2, . . . , PN$_1$) to the domain identifier (Domain_ID) comprising obtaining or generating a domain users list (DUC) comprising the domain identifier and a unique identifier,
means for binding at least one device (D1, D2, . . . , DM) to the domain identifier (Domain_ID), and
means for binding at least one content item (C1, C2, . . . , CN$_2$) to the Authorized Domain (AD) given by the domain identifier (Domain_ID),
thereby obtaining a number of devices (D1, D2, . . . , DM) and a number of persons (P1, P2, . . . , PN$_1$) that is authorized to access content items (C1, C2, . . . , CN$_2$) of said Authorized Domain (AD),
wherein access to the at least one content item (C1, C2, . . . , CN$_2$) is obtained, via an authorization certificate, by verifying that the at least one content item (C1, C2, . . . , CN$_2$) and the at least one person (P1, P2, . . . , PN$_1$) are linked to the same domain identifier (Domain_ID) or by verifying that the at least one device (D1, D2, . . . , DM) and the at least one content item (C1, C2, . . . , CN$_2$) are linked to the same domain identifier (Domain_ID);
wherein the authorization certificate includes the domain identifier (Domain_ID) in a holder field of the authorization certificate, and
wherein the authorization certificate comprises rights data specifying rules, rights and conditions pertaining to access to certain content items for the at least one person in the domain or for every user in the domain and therefore creates or defines part of the domain.

12. A system according to claim 11, wherein the means for binding at least one person (P1, P2, . . . , PN$_1$) to the domain identifier (Domain_ID) is adapted to
obtain or generate a Domain Users List (DUC) comprising the domain identifier (Domain_ID) and a unique identifier (Pers_ID1, Pers_ID2, . . . , Pers_IDN$_1$) for a person (P1, P2, . . . , PN$_1$) thereby defining that the person is bound to the Authorized Domain (AD),
and/or in that
the means for binding at least one device (D1, D2, . . . , DM) to the domain identifier (Domain_ID) is adapted to:
obtain or generate a Domain Devices List (DDC) comprising the domain identifier (Domain_ID) and a unique identifier (Dev.ID1, Dev.ID2, . . . Dev.IDM) for a device (D1, D2, . . . , DM) thereby defining that the device is bound to the Authorized Domain (AD).

13. A system according to claim 12, wherein the system further comprises means for controlling access to a given content item (C1, C2, . . . , CN$_2$), being bound to the Authorized Domain (AD) and having a unique content identifier (Cont_ID), by a given device being operated by a given person, where the means is adapted to:
check if the Domain Devices List (DDC) of the Authorized Domain (AD) comprises an identifier (Dev.ID) of the given device, thereby checking if the given device is bound to the same Authorized Domain (AD) as the content item, and/or
check if the Domain User List (DUC) of the Authorized Domain (AD) comprises an identifier (Pers_ID) of the given person (P1, P2, . . . , PN$_1$) thereby checking if the given person is bound to the same Authorized Domain (AD) as the content item,
and allow access to the given content item (C1, C2, . . . , CN$_2$) by the given device (D1, D2, . . . , DM) for any person if the given device is bound to the same Authorized Domain (AD) as the content item being accessed, and/or allow access to the given content item (C1, C2, . . . , CN$_2$) by any device including the given device for the given person if the given person is bound to the same Authorized Domain (AD) as the content item being accessed.

14. A system according to claim 12, wherein the means for binding at least one content item (C1, C2, . . . , CN$_2$) to the Authorized Domain (AD) is adapted to:
bind a content item (C1, C2, . . . , CN$_2$) to a User Right (URC1, URC2, . . . URCN$_2$), where said User Right (URC1, URC2, . . . URCN$_2$) is bound to a person (P1, P2, . . . , PN$_1$) which is bound to the Authorized Domain (AD), and/or bind a content item (C1, C2, ..., $CN_2$) to a Device Right (DevRC), where said Device Right (DevRC) is bound to a device (D1, D2, ..., DM) which is bound to the Authorized Domain (AD), and/or bind a content item (C1, C2, ..., $CN_2$) to a Domain Rights (DRC1, DRC2, ... $DRCN_2$), where said Domain Rights (DRC1, DRC2, ... $DRCN_2$) is bound to the Authorized Domain (AD).

15. A system according to claim 14, wherein the User Right (URC1, URC2, ... $URCN_2$) or the Device Right (DevRC) or the Domain Rights (DRC) comprises rights data (Rghts Dat) representing which rights exists in relation to the at least one content item (C1, C2, ..., $CN_2$) bound to the User Right (URC1, URC2, ... $URCN_2$) or the Device Right (DevRC) or the Domain Rights (DRC1, DRC2, ... $DRCN_2$).

16. A system according to claim 14, wherein
    the Domain Users List (DUC) is implemented as or included in a Domain Users Certificate, and/or
    the Domain Devices List (DDC) is implemented as or included in a Domain Devices Certificate, and/or
    the User Right (URC1, URC2, ..., $URCN_2$) is implemented as or included in a User Right Certificate, and/or
    the Device Right (DevRC) is implemented as or included in a Device Right Certificate, and/or
    the Domain Rights (DRC1, DRC2, ..., $DRCN_2$) is implemented as or included in a Domain Rights Certificate.

17. A system according to claim 11, wherein the system further comprises means for controlling access to a given content item bound to the Authorized Domain (AD) by a given device being operated by a given person, where the means is adapted to:
    check if the given person is bound to the same Authorized Domain (AD) as the given content item, or
    check if the given device is bound to the same Authorized Domain (AD) as the given content item,
    and allow access for the given person via the given device and/or other devices to the content item if the given person is bound to the same Authorized Domain (AD),
    or allow access for the given person and/or other persons via the given device to the content item if the given device is part of the same Authorized Domain (AD).

18. A system according to claim 17, wherein the means for binding at least one content item (C1, C2, ..., $CN_2$) to the Authorized Domain (AD) is adapted to:
    bind a content item (C1, C2, ..., $CN_2$) to a User Right (URC1, URC2, ... $URCN_2$), where said User Right (URC1, URC2, ... $URCN_2$) is bound to a person (P1, P2, ..., $PN_1$) which is bound to the Authorized Domain (AD), and
wherein the means for controlling access of a given content item is further adapted to further:
    check that the User Right (URC1, URC2, ... $URCN_2$) for the given content item specifies that the given person (P1, P2, ..., $PN_1$) has a right to access the given content item (C1, C2, ..., $CN_2$) and only allowing access to the given content item (C1, C2, ..., $CN_2$) in the affirmative.

19. A system according to claim 11, wherein every content item is encrypted and that a content right (CR) is bound to each content item and to a User Right (URC) or a Device Right (DevRC) or a Domain Rights (DRC), and that the content right (CR) of a given content item comprises a decryption key for decrypting the given content item.

20. A method of operating an Authorized Domain (AD), the method comprises:
    obtaining a domain identifier (Domain_ID) uniquely identifying the Authorized Domain (AD),
    binding an identification of at least one person (P1, P2, ..., PN1) to the domain identifier (Domain_ID) comprising obtaining or generating a domain users list (DUC) comprising the domain identifier and a unique identifier,
    binding an identification of at least one device (D1, D2, ..., DM) to the domain identifier (Domain_ID), and
    binding the identification of at least one content item (C1, C2, ..., CN2) to the Authorized Domain (AD) given by the domain identifier (Domain_ID),
    thereby obtaining a number of devices (D1, D2, ..., DM) and a number of persons (P1, P2, ..., PN1) that are authorized to access content items (C1, C2, ..., CN2) of said Authorized Domain (AD),
    controlling access to the at least one content item (C1, C2, ..., CN2) depending on an authorization certificate, by verifying that the identification of the at least one content item (C1, C2, ..., CN2) and the identification of the at least one person (P1, P2, ..., PN1) are linked to the same domain identifier (Domain_ID) or by verifying that the identification of the at least one device (D1, D2, ..., DM) and the identification of the at least one content item (C1, C2, ..., CN2) are linked to the same domain identifier (Domain_ID);
    wherein the authorization certificate includes the domain identifier (Domain_ID) in a holder field of the authorization certificate, and
    wherein the authorization certificate comprises rights data specifying rules, rights and conditions pertaining to access to certain content items for the at least one person in the domain or for every user in the domain and therefore creates or defines part of the Authorized Domain.

21. An Authorized Domain (AD), comprising:
    at least one hardware processor; and
    means for obtaining a domain identifier (Domain_ID) uniquely identifying the Authorized Domain (AD),
    means for binding an identification of at least one person (P1, P2, ..., PN1) to the domain identifier (Domain_ID) comprising obtaining or generating a domain users list (DUC) comprising the domain identifier and a unique identifier,
    means for binding an identification of at least one device (D1, D2, ..., DM) to the domain identifier (Domain_ID), and
    means for binding an identification of at least one content item (C1, C2, ..., CN2) to the Authorized Domain (AD) given by the domain identifier (Domain_ID),
    thereby obtaining a number of devices (D1, D2, ..., DM) and a number of persons (P1, P2, ..., PN1) that is authorized to access content items (C1, C2, ..., CN2) of said Authorized Domain (AD),
    means for allowing access to the at least one content item (C1, C2, ..., CN2) depending on an authorization certificate, by verifying that the identification of the at least one content item (C1, C2, ..., CN2) and the identification of the at least one person (P1, P2, ..., PN1) are linked to the same domain identifier (Domain_ID) or by verifying that the identification of the at least one device (D1, D2, ..., DM) and the identification of the at least one content item (C1, C2, ..., CN2) are linked to the same domain identifier (Domain_ID);
    wherein the authorization certificate includes the domain identifier (Domain_ID) in a holder field of the authorization certificate, and wherein the authorization certificate comprises rights data specifying rules, rights and conditions pertaining to access to certain content items for the at least one person in the domain or for every user in the domain and therefore creates or defines part of the domain.

22. A non-transitory computer readable media encoded with control instructions to control an Authorized Domain (AD) to operate a method comprising:
  obtaining a domain identifier (Domain_ID) uniquely identifying the Authorized Domain (AD),
  binding an identification of at least one person (P1, P2, ..., PN1) to the domain identifier (Domain_ID) comprising obtaining or generating a domain users list (DUC) comprising the domain identifier and a unique identifier,
  binding an identification of at least one device (D1, D2, ..., DM) to the domain identifier (Domain_ID), and
  binding the identification of at least one content item (C1, C2, ..., CN2) to the Authorized Domain (AD) given by the domain identifier (Domain_ID),
  thereby obtaining a number of devices (D1, D2, ..., DM) and a number of persons (P1, P2, ..., PN1) that are authorized to access content items (C1, C2, ..., CN2) of said Authorized Domain (AD),
  controlling access to the at least one content item (C1, C2, ..., CN2) depending on an authorization certificate, by verifying that the identification of the at least one content item (C1, C2, ..., CN2) and the identification of the at least one person (P1, P2, ..., PN1) are linked to the same domain identifier (Domain_ID) or by verifying that the identification of the at least one device (D1, D2, ..., DM) and the identification of the at least one content item (C1, C2, ..., CN2) are linked to the same domain identifier (Domain_ID);
  wherein the authorization certificate includes the domain identifier (Domain_ID) in a holder field of the authorization certificate, and
  wherein the authorization certificate comprises rights data specifying rules, rights and conditions pertaining to access to certain content items for the at least one person in the domain or for every user in the domain and therefore creates or defines part of the Authorized Domain.

* * * * *